United States Patent
Wege et al.

(10) Patent No.: US 6,841,626 B1
(45) Date of Patent: Jan. 11, 2005

(54) METHOD FOR HYDROGENATING AROMATIC POLYMERS IN THE PRESENCE OF SPECIAL CATALYSTS

(75) Inventors: Volker Wege, Neuss (DE); Konstadinos Douzinas, Köln (DE); Johann Rechner, Kempen (DE)

(73) Assignees: Bayer Aktiengesellschaft, Leverkusen (DE); Teijin Limited, Osaka (JP)

( * ) Notice: Subject to any disclaimer, the term of this patent is extended or adjusted under 35 U.S.C. 154(b) by 0 days.

(21) Appl. No.: 09/890,737
(22) PCT Filed: Jan. 26, 2000
(86) PCT No.: PCT/EP00/00576
§ 371 (c)(1), (2), (4) Date: Aug. 30, 2001
(87) PCT Pub. No.: WO00/46259
PCT Pub. Date: Aug. 10, 2000

(30) Foreign Application Priority Data

Feb. 5, 1999 (DE) .......................... 199 04 612

(51) Int. Cl.⁷ .............................. C08C 19/02
(52) U.S. Cl. .................... 525/333.3; 525/338; 525/339; 525/370
(58) Field of Search ............................. 525/333.3, 338, 525/339

(56) References Cited

U.S. PATENT DOCUMENTS

| | | | |
|---|---|---|---|
| 4,997,898 A | 3/1991 | Ishihara et al. | 526/308 |
| 5,352,744 A | 10/1994 | Bates et al. | 525/339 |
| 5,612,422 A | 3/1997 | Hucul et al. | 525/338 |
| 5,700,878 A | 12/1997 | Hucul et al. | 525/333.3 |

FOREIGN PATENT DOCUMENTS

| | | |
|---|---|---|
| EP | 0 378 104 | 7/1990 |
| EP | 378104 * | 7/1990 |
| EP | 0 814 098 | 12/1997 |
| GB | 933127 | 8/1963 |
| GB | 2011911 | 7/1979 |

OTHER PUBLICATIONS

Applied Heterogeneous Catalysis, Institute Francais du Petrole Publication, pp. 189–237 (month unavailable) 1987, 7.1 Elementary Composition of Catalysts.

* cited by examiner

Primary Examiner—Roberto Rabago
(74) Attorney, Agent, or Firm—Joseph C. Gil; Aron Preis

(57) ABSTRACT

A process for hydrogenating aromatic polymers is disclosed. The process entails using a supported catalyst wherein support contains alumina and where the catalyst comprise at least one metal of subgroup VIII of the Periodic Table. The catalyst is characterized in that the pore volume of the pores having diameters of 1000 to 10,000 Angstrom is 15 to 100% relative to the total pore volume, as determined by mercury porosimetry.

6 Claims, No Drawings

METHOD FOR HYDROGENATING AROMATIC POLYMERS IN THE PRESENCE OF SPECIAL CATALYSTS

The present invention relates to a process for the hydrogenation of aromatic polymers, which is characterised in that metals of subgroup VIII of the periodic table are present, together with a support comprising alumina. The catalysts have a special pore volume distribution. By this means, the aromatic units of aromatic polymers can be hydrogenated completely and without significant reduction of their molecular weights.

The hydrogenation of aromatic polymers is already known. DE-AS 1 131 885 describes the hydrogenation of polystyrene in the presence of catalysts and solvents. Aliphatic and cycloaliphatic hydrocarbons, ethers, alcohols and aromatic hydrocarbons are mentioned as solvents. A mixture or cyclohexane and tetrahydrofuran is stated to be preferred. Silica and alumina supports for the catalysts are mentioned in general, but the physicochemical structure thereof is not described.

EP-A-322 731 describes the production of what are predominantly syndiotactic polymers based on vinylcyclohexane, wherein a styrene-based polymer is hydrogenated in the presence of hydrogenation catalysts and solvents. Cycloaliphatic and aromatic hydrocarbons are mentioned as solvents, but ethers are not mentioned.

DE 196 24835 (=EP-A 814 098), which relates to the hydrogenation of polymers using ruthenium or palladium catalysts in which the active metal is deposited on a porous support, describes the hydrogenation of olefinic double bonds of polymers.

Aromatic regions are hydrogenated by less than 25%, and in general are hydrogenated within a range from 0 to about 7%. The choice of solvent is not critical.

It is also known (WO 96/34896=U.S. Pat. No. 5,612,422) that silica-supported catalysts for the hydrogenation of aromatic polymers, which catalysts have small pore diameters (200–500 Å) and large specific surfaces (100–500 m$^2$/g), can result in incomplete hydrogenation and to a breakdown of the polymer chain. The use of special silica-supported hydrogenation catalysts (WO 96/34896) enables what is almost complete hydrogenation to be achieved with a reduction of about 20% in molecular weights. These catalysts comprise a special pore size distribution of the silica, which is characterised in that 98% of the pore volume corresponds to a pore diameter larger than 600 Å. Said catalysts have specific surfaces between 14–17 m$^2$/g and average pore diameters of 3800–3900 Å. Dilute solutions of polystyrene in cyclohexane, with a concentration ranging from 1% to a maximum of 8%, are hydrogenated with degrees of hydrogenation greater than 98% and less than 100%.

The examples described in the documents cited above indicate a reduction in the absolute molecular weight of hydrogenated polystyrene at polymer concentrations less than 2%. In general, a reduction in molecular weight results in a deterioration in the mechanical properties of a hydrogenated polystyrene.

The comparative example in WO 96/34896, in which a commercially available 5% Rh/Al$_2$O$_3$ catalyst is used (Engelhard Corp., Beachwood, Ohio, USA) results in a degree of hydrogenation of 7% and indicates the lower activity of an alumina support compared with a silica-supported catalyst.

Surprisingly, it has now been found that aromatic polymers can be completely hydrogenated without a significant reduction in molecular weight, by using special catalysts, wherein the catalyst is defined in that 10% at most of its pore volume corresponds to a pore diameter less than 600 Å, and it has an average pore diameter greater than 1000 Å and a specific surface greater than 3 m$^2$/g, and comprises a defined pore size distribution.

The present invention relates to a process for the hydrogenation of aromatic polymers in the presence of catalysts, wherein a metal or a mixture of metals of subgroup VIII of the periodic table, together with a support comprising alumina, is used as a catalyst, and the pore volume corresponding to the pore diameter of the catalyst between 1000 and 10,000 Å, as measured by mercury porosimetry, is generally 100–15%, preferably 90–20%, most preferably 80–25%, particularly 70 to 30%, with respect to the total pore volume as measured by mercury porosimetry.

The average pore diameter, as determined by mercury porosimetry, is greater than 1000 Å.

However, the mercury method is only satisfactory for pores which are larger than 60 Å. Pore diameters smaller than 600 Å are therefore determined by nitrogen sorption as described by Barret, Joyner and Halenda (DIN 66 134).

The catalysts have a pore volume as measured by nitrogen sorption of less than 10%, preferably less than 5%, for pore diameters less than 600 Å. The pore volume as measured by nitrogen sorption is quoted with respect to the total pore volume as measured by mercury porosimetry.

The average pore diameter and the pore size distribution are determined by mercury porosimetry according to DIN 66 133.

The average pore diameter generally ranges from 1000 Å to 10,000 Å, preferably from 2000 Å to 7000 Å, most preferably from 2500 Å to 6000 Å.

Methods for the characterisation of hydrogenation catalysts are described in WO 96/34896 (=(JS-A-5,612,422), and in Applied Heterogeneous Catalysis, Institute Fraçcais du Petrole Publication, pages 189–237 (1987), for example.

The catalysts consist of metals of subgroup VIII, which are present together with a support comprising alumina.

Aluminas of general chemical formula Al$_2$O$_3$ occur in various modifications. A distinction is made, for example, between hexagonal α-Al$_2$O$_3$ and face-centered cubic crystalline γ-Al$_2$O$_3$. β-Al$_2$O$_3$ is understood to comprise a group of aluminas which contain small amounts of extraneous ions in their crystalline lattice. Other special modifications exist, and numerous transitional forms exist between aluminium hydroxides and aluminas.

The specific surface of the catalyst is determined by the BET (Brunauer, Emmett and Teller) method using nitrogen adsorption according to DIN 66 131 and DIN 66 132.

The (BET) specific surfaces for nitrogen are generally greater than 3 m$^2$/g, and preferably range from 5 m$^2$/g to 80 m$^2$/g, most preferably from 8 m$^2$/g to 60 m$^2$/g.

Metals of subgroup VIII are generally used, preferably nickel, platinum, ruthenium, rhodium, or palladium, most preferably platinum or palladium.

The metal content is generally 0.01 to 80%, preferably 0.05 to 70% with respect to the total weight of catalyst.

In a process which is operated as a batch process, the 50% value of the cumulative distribution of particle size generally ranges from 0.1 μm to 200 μm, preferably from 1 μm to 100 μm, most preferably from 3 μm to 80 μm.

The usual solvents for hydrogenation reactions are aliphatic or cycloaliphatic hydrocarbons, aliphatic or cycloaliphatic saturated ethers, or mixtures thereof, e.g. cyclohexane, methylcyclopentane, methylcyclohexane, ethylcyclohexane, cyclooctane, cycloheptane, dodecane, dioxane, diethylene glycol dimethyl ether, tetrahydrofuran, isopentane and decahydronaphthalene.

If aliphatic or cycloaliphatic hydrocarbons are used as solvents, they preferably contain water in a amount which ranges in general from 0.1 ppm to 500 ppm, preferably from 0.5 ppm to 200 ppm, most preferably from 1 ppm to 150 ppm, with respect to the total solvent.

The process according to the invention generally results in what is practically the is $\geq 80\%$, preferably $\geq 90\%$, most preferably $\geq 99\%$ to 100%. The degree of hydrogenation can be determined by NMR spectrometry or UV spectroscopy, for example. The process according to the invention most preferably results in hydrogenated aromatic polymers, particularly polyvinylcyclohexane, wherein the amount of dyads with a syndiotactic configuration is greater than 50.1% and less than 74%, particularly 52 to 70%.

Aromatic polymers are used as the starting materials, and ar selected, for example, from polystyrenes which are optionally substituted on their phenyl ring or on their vinyl group, or from copolymers thereof with monomers selected from the group comprising olefines, (meth)acrylates or mixtures thereof. Other suitable polymers include aromatic polyethers, particularly polyphenylene oxide, aromatic polycarbonates, aromatic polyesters, aromatic polyamides, polyphenylenes, polyxylylenes, polyphenylene vinylenes, polyphenylene ethinylenes, polyphenylene sulphides, polyaryl ether ketones, aromatic polysulphones, aromatic polyether sulphones, aromatic polyimides and mixtures thereof, and optionally copolymers with aliphatic compounds also.

Suitable substituents in the phenyl ring include $C_1$–$C_4$ alkyl groups, such as methyl or ethyl, $C_1$–$C_4$ alkoxy groups such as methoxy or ethoxy, and aromatic entities which are condensed thereon and which are bonded to the phenyl ring via a carbon atom or via two carbon atoms, comprising phenyl, biphenyl and naphthyl.

Suitable substituents on the vinyl group include $C_1$–$C_4$ alkyl groups such as methyl, ethyl, or n- or iso-propyl, particularly methyl in the α-position.

Suitable olefinic comonomers include ethylene, propylene, isoprene, isobutylene, butadiene, cyclohexadiene, cyclohexene, cyclopentadiene, norbornenes which are optionally substituted, dicyclopentadienes which are optionally substituted, tetracyclododecenes which are optionally substituted, and dihydrocyclopentadienes which are substituted, $C_1$–$C_{R[,\ preferably\ C1}$–$C_4$ alkyl esters of (meth)acrylic acid, preferably methyl and ethyl esters, $C_1$–$C_8$, preferably $C_1$–$C_4$ alkyl ethers of vinyl alcohol, preferably methyl and ethyl ethers, $C_1$–$C_8$, preferably $C_1$–$C_4$ alkyl esters of vinyl alcohol, preferably vinyl acetate, derivatives of maleic acid, preferably maleic anhydride, derivatives of acrylonitrile, preferably acrylonitrile and methacrylonitrile.

The preferred polymers are polystyrene, polymethylstyrene, and copolymers of styrene and at least one other monomer selected from the group consisting of α-methylstyrene, butadiene, isoprene, acrylonitrile, methyl acrylate, methyl methacrylate, maleic anhydride and olefines such as ethylene and propylene for example. Examples of suitable copolymers include those formed from acrylonitrile, butadiene and styrene, copolymers of acrylic esters, styrene and acrylonitrile, copolymers of styrene and α-methylstyrene, and copolymers of propylene, diene and styrene.

The aromatic polymers generally have (weight average) molecular weights Mw from 1000 to 10,000,000, preferably from 60,000 to 1,000,000, most preferably from 70,000 to 600,000, particularly from 100,000 to 480,000, as determined by light scattering.

The polymers can have a linear chain structure or can have branching locations due to co-units (e.g. graft copolymers). The branching centres may comprise star-shaped or branched polymers, or may comprise other geometric forms of the primary, secondary, tertiary or optionally of the quaternary polymer structure.

The copolymers may exist as random copolymers or alternatively may exist as block copolymers.

Block copolymers comprise di-blocks, tri-blocks, multi-blocks and star-shaped block copolymers.

The initial polymers which are used are generally known (e.g. WO 94/21694).

The amount of catalyst to be used is described in WO 96/34896, for example.

The amount of catalyst used depends on the process which is carried out. This process can be conducted continuously, semi-continuously or batch-wise.

In a continuous system, the time of reaction is considerably shorter: it is influenced by the dimensions of the reaction vessel. In a continuous procedure, it is possible to use a trickling system or a liquid pool system, which both employ fixed catalysts, and it is also possible to use a system comprising a suspended catalyst, which can be recycled for example. Fixed catalysts can exist in the form of tablets or as an extruded product, for example.

The polymer concentrations with respect to the total weight of solvent and polymer generally range from 80 to 1, preferably from 50 to 10, particularly from 40 to 15% by weight.

The reaction is generally conducted at temperatures between 0 and 500° C., preferably between 20 and 250° C., particularly between 60 and 200° C.

The reaction is generally conducted at pressures from 1 bar to 1000 bar, preferably from 20 to 300 bar, particularly from 40 to 200 bar.

The palladium catalyst can be used either in reduced form or in unreduced form in the reaction concerned, whilst maintaining a comparable activity. In an industrial process, it is considerably more advantageous to employ the catalyst in unreduced form and not to have to carry out an additional, costly catalyst reduction step as in WO 96/34 896.

EXAMPLES

The absolute (weight average) molecular weights Mw of the initial polymer and of the hydrogenated product were determined by light scattering. The absolute (number average) molecular weights Mn were determined by membrane osmosis. In Example 2, the relative Mw value obtained from the GPC determination (gel permeation chromatograpy using tetrahydrofuran as the elutant) compared with a polystyrene standard corresponded to the absolute molecular weights which were determined for the polystyrene used.

Examples 1 and 2

The catalysts used in the examples are characterised in Table 1.

A 1 liter autoclave was flushed with inert gas. The polymer solution and optionally the unreduced catalyst were added (Table 2). After closing the autoclave, it was repeatedly pressurised with a protective gas and then with hydrogen. After releasing the pressure, the respective hydrogen pressure was set and the batch was heated with stirring to the corresponding reaction temperature. After the consumption of hydrogen had commenced, the reaction pressure was held constant.

The time of reaction was the time from heating up the batch until complete hydrogenation was effected of the polystyrene, or was the time until the consumption of hydrogen tended towards its saturation value.

After the reaction was complete, the polymer solution was filtered. The product was precipitated in methanol and dried. The isolated product had the physical properties listed in the Table.

The catalyst is distinguished by a weight of noble metal which is less by a factor of 10, which results in a significant reduction in raw material costs and which thus improves the economics of the hydrogenation process.

What is claimed is:

1. A process for the hydrogenation of aromatic polymers in the presence of catalysts, wherein a metal or a mixture of metals of subgroup VIII of the periodic table, together with a support comprising alumina, is used as a catalyst, and the pore volume corresponding to the pore diameter of the catalyst between 1000 and 10,000 Å, as measured by mercury porosimetry, is 70 to 30% with respect to the total pore volume as measured by mercury porosimetry.

2. A process according to claim 1 wherein the catalysts have a pore volume, as measured by nitrogen sorption, of less than 10% for pore diameters less than 600 Å.

3. A process according to claim 1 wherein the metals are selected from nickel, platinum, ruthenium, rhodium and palladium.

4. A process according to claim 1 wherein the process is conducted in the presence of solvents which can be used for hydrogenation reactions.

5. A process according to claim 1 wherein the catalyst has a specific surface greater than 5 $m^2/g$.

6. A process for hydrogenating aromatic polymers comprising using a supported catalyst wherein support contains alumina and where the catalyst comprise at least one metal of subgroup VIII of the Periodic Table, said catalyst characterized in that the pore volume of the pores having diameters of 1000 to 10,000 Angstrom, is 30 to 70% relative to the total pore volume, said pore volume determined by mercury porosimetry.

TABLE 1

Physical characterisation of the catalysts used

| Catalyst No. | Nitrogen pore volume for pore diameters of <600 Å $mm^3/g$ | Total mercury pore volume for pore diameters from 38 Å–15 μm $mm^3/g$ | Mercury pore volume for pore diameters from 1000 Å–10,000 Å $mm^3/g$ | $N_2$ pore volume for pore diameters of <600 Å/total mercury pore volume % | Pore volume for pore diameters of 1000 Å–10,000 Å/ total mercury pore volume (38 Å-15 μm) % | Average pore diameter[1] Å | Total specific surface (BET)[2] $m^2/g$ | Metal content % |
|---|---|---|---|---|---|---|---|---|
| 1 | 32 | 767 | 480 | 4 | 63 | 2722 | 11.9 | 0.5 |

Catalyst: Engelhard De Meern, Holland, C 586-102, palladium on alumina
[1] average pore diameter as measured by mercury porosimetry
[2] total specific nitrogen surface according to Brunauer, Emmett and Teller (BET, DIN 66131, DIN 66132)

TABLE 2

Hydrogenation of polystyrene as a function of the catalyst, solvent system and reaction temperature

| Example No. | Catalyst | Weight of polymer g | Solvent[3] ml | Weight of catalyst g | Reaction temperature °C. | $H_2$ pressure bar | Time of reaction min | Degree of hydrogenation[4] % | Tg (DSC) °C. | Mw $10^3$ g/mol |
|---|---|---|---|---|---|---|---|---|---|---|
| 1 (comparative) US-A 5612422 | 5% Pt/$SiO_2$ | 200[1]) Mw ~ 200,000 g $mol^{-1}$ | 2300 CH | 13.5 | 150 | 875 (psig) | 110 | 98.4 | 146.6 | — |
| 2 according to the invention | 0.5% Pd/$Al_2O_3$[5] | 100.2[2]) | 300 CYH | 12.5 | 200 | 100 | 130 | 100 | 147 | 171 |

[1]) polystyrene (Mw ~ 200,000 g $mol^{-1}$)
[2]) polystyrene type 158 k, Mw = 280,000 g/mol, BASF AG, Ludwigshafen, Germany
[3]) CYH = cyclohexane
[4]) determined by $^1$H NMR spectrometry
[5]) Engelhard De Meern, Holland, palladium on alumina, C586-102

The platinum catalyst (Table 2), which was characterised in that 98% of the pore volume corresponded to a pore diameter greater than 600 Å, did not completely hydrogenate polystyrene after 110 minutes at 150° C. (98.4%; comparative example 1).

The platinum catalyst according to Example 5 of U.S. Pat. No. 5,612,422 resulted in a decrease of about 20% in the molecular weight Mw.

A decrease in molecular weight results in particular in a reduction of the average molecular weight Mw (U.S. Pat. No. 5,612,422). Surprisingly, hydrogenation according to the invention in the presence of the alumina catalyst resulted in no significant decrease in the absolute molecular weight Mw, even at elevated temperatures of reaction.

Within the range of accuracy of the measurements, the absolute average molecular weight Mw of the hydrogenated product corresponded to that of the polystyrene used.

Compared with comparative example 1, the special alumina catalyst of the present invention resulted in a comparable time of reaction, but with complete hydrogenation being achieved at the same time, using a polystyrene of higher molecular weight and at a higher polymer concentration.